US012655959B2

(12) United States Patent
Hikmet et al.

(10) Patent No.: US 12,655,959 B2
(45) Date of Patent: Jun. 16, 2026

(54) OPTICAL COMPONENT, LUMINAIRE COMPRISING SUCH A COMPONENT AND MANUFACTURING METHOD THEREFOR

(71) Applicant: SIGNIFY HOLDING B.V., Eindhoven (NL)

(72) Inventors: Rifat Ata Mustafa Hikmet, Eindhoven (NL); Johannes Petrus Maria Ansems, Hulsel (NL); Ties Van Bommel, Horst (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/867,496

(22) PCT Filed: Jun. 19, 2023

(86) PCT No.: PCT/EP2023/066477

§ 371 (c)(1),
(2) Date: Nov. 20, 2024

(87) PCT Pub. No.: WO2023/247446

PCT Pub. Date: Dec. 28, 2023

(65) Prior Publication Data

US 2025/0383063 A1 Dec. 18, 2025

(30) Foreign Application Priority Data

Jun. 23, 2022 (EP) .................................... 22180756

(51) Int. Cl.
*F21V 5/04* (2006.01)
*F21V 7/04* (2006.01)
(Continued)

(52) U.S. Cl.
CPC .............. *F21V 5/046* (2013.01); *F21V 7/041* (2013.01); *F21V 7/24* (2018.02); *F21V 13/04* (2013.01)

(58) Field of Classification Search
CPC . F21V 5/046; F21V 7/041; F21V 7/24; F21V 13/04
See application file for complete search history.

(56) References Cited

U.S. PATENT DOCUMENTS 11,241,849 B2 * 2/2022 Boonekamp .......... B29C 64/106
2005/0024744 A1 2/2005 Falicoff et al.
(Continued)

FOREIGN PATENT DOCUMENTS

DE 102019129135 A1 4/2021
EP 3888886 A1 * 10/2021 ................ F21V 1/26
(Continued)

*Primary Examiner* — Tracie Y Green
*Assistant Examiner* — Michael Chiang

(57) ABSTRACT

The present invention relates to an optical component (100) for beam shaping comprising a conical reflector (101) having an inner surface being diffusely reflective, a transparent refractive hollow dome-shaped member (102), wherein said transparent refractive hollow dome-shaped member (102) has a proximal end (103) arranged in contact with said conical reflector (101), and a top (104) arranged at a distance from said conical reflector (101), wherein said top (104) has an opening (105) and that said transparent refractive hollow dome-shaped member (102) is manufactured by means of fused deposition modeling (FDM) using a transparent thermoplastic polymer material as printing material. The present invention also relates to a luminaire (10) and a method (200) for manufacturing such an optical component (100).

14 Claims, 4 Drawing Sheets

(51) Int. Cl.
*F21V 7/24* (2018.01)
*F21V 13/04* (2006.01)

(56) References Cited

U.S. PATENT DOCUMENTS

| | | | | |
|---|---|---|---|---|
| 2008/0291682 | A1* | 11/2008 | Falicoff | G02B 19/0028 362/310 |
| 2010/0038663 | A1 | 2/2010 | Benitez et al. | |
| 2018/0319076 | A1* | 11/2018 | Hikmet | F21V 1/26 |
| 2020/0114572 | A1 | 4/2020 | Hikmet et al. | |
| 2022/0126540 | A1 | 4/2022 | Boonekamp et al. | |
| 2024/0369206 | A1* | 11/2024 | Hikmet | F21V 5/046 |

FOREIGN PATENT DOCUMENTS

| | | | |
|---|---|---|---|
| JP | 2005004473 | A | 1/2005 |
| JP | 2005044738 | A | 2/2005 |
| WO | 2021136716 | A1 | 7/2021 |

* cited by examiner

OPTICAL COMPONENT, LUMINAIRE COMPRISING SUCH A COMPONENT AND MANUFACTURING METHOD THEREFOR

CROSS-REFERENCE TO PRIOR APPLICATIONS

This application is the U.S. National Phase application under 35 U.S.C. § 371 of International Application No. PCT/EP2023/066477, filed on Jun. 19, 2023, which claims the benefit of European Patent Application No. 22180756.3, filed on Jun. 23, 2022. These applications are hereby incorporated by reference herein.

TECHNICAL FIELD

The present disclosure relates to an optical component for beam shaping comprising a conical reflector having an inner surface being diffusely reflective, a transparent refractive hollow dome-shaped member, wherein said transparent refractive hollow dome-shaped member has a proximal end arranged in contact with said conical reflector and a top arranged at a distance from said conical reflector. The disclosure also relates to a luminaire comprising such optical component and a method for manufacturing such an optical component.

BACKGROUND

In the present day situation, reflective optical components are used for obtaining beam shaping effects in for instance light beam shaping spot and down light arrangements. Such type of reflectors require a highly reflective aluminium coverage of the flat surfaces in the optical components. For that reason such reflectors and reflective optical components cannot be manufactured using additive manufacturing technology.

DE102019129135 (A1) describes producing optical components, not including reflectors, by means of printing with droplets.

SUMMARY

It is an object of the present invention to provide an improved solution that alleviates the mentioned drawbacks of present solutions.

A first object of the invention is to provide a lighting device, which may provide an improved beam shaping capability, particularly from a light source outward in a forward direction.

This object is solved by the invention according to claim 1.

A second object of the invention is to provide a lighting device which provides an intensity gain, particularly in said forward direction.

This object is solved by the invention according to claim 10.

A third object is to provide an improved manufacturing method by means of additive manufacturing in accordance with the objects specified above, but also a more effective and cheaper manufacturing process.

This object is solved by the invention according to claim 14.

Preferred embodiments are specified in the dependent claims and further specified in the following.

According to a first aspect of the invention, an optical component for beam shaping is provided. The optical component of the present invention comprises a conical reflector having an inner surface being diffusely reflective and a transparent refractive hollow dome-shaped member. The transparent refractive hollow dome-shaped member has a proximal end arranged in contact with said conical reflector, and a top arranged at a distance from said conical reflector.The top has an opening and said transparent refractive hollow dome-shaped member is manufactured by means of fused deposition modeling (FDM) using a transparent polymeric material as printing material.

By the combination of the conical reflector having an inner surface being diffusely reflective and the transparent refractive hollow dome-shaped member, the provided optical component may provide an intensity gain, particularly from the light source outward in the forward direction from the light source. Furthermore, the open top provided into the top part of the optical component may provide beam shaping effects, also particularly from the light source in said forward direction. The top part is adjacent open top, thus the opening. The bottom part is adjacent the conical reflector having an inner surface being diffusely reflective, and also to the light source. By means of the fused deposition modeling (FDM) using a transparent polymeric material as printing material, cost-efficient components may also be provided.

According to one embodiment, said conical reflector is manufactured by means of fused deposition modeling using a reflective thermoplastic polymer material as further printing material. Said transparent termoplastic polymer material as printing material may provide effects such as the ribbed structure.

According to one embodiment, said transparent refractive hollow dome-shaped member is a layer by layer structure, wherein each layer has a layer thickness and a layer width. The layer thickness to layer width ratio may preferably be in the range of 0.8-0.3. In said layer to layer structure, each layer may be deposited (or printed) on a previous, preceeding deposited layer. Further, each deposited layer may have a variation in layer thickness and a variation in layer width, when deposited. Thus, the provided layer thickness to layer width ratio may vary. By means of a particular layer thickness to layer width ratio in the range of 0.8-0.3, the material of the the transparent refractive hollow dome-shaped member may provide an improved sharpness in central intensity and also an intensity gain.

According to one embodiment, the transparent refractive hollow dome-shaped member has a ribbed surface texture. The ribbed structure may be on the inner side and/or on the outer side of the dome-shaped member. By the layer on layer structure provided by the fused deposition modeling (FDM) and the transparent polymeric material as printing material, a transparent refractive hollow dome-shaped member having the characteristic ribbed surface texture may be provided. By said characteristic ribbed surface texture of the printed transparent polymeric material, an intensity gain may be provided in an optical component when provided on a light source. The light source may be a Lambertian light source.

According to one embodiment, the transparent refractive hollow dome-shaped member is cone-shaped and has a cross-section with a circular or polygon-shape, or combinations thereof. Polygon-shaped may in the context of the present disclosure be understood as triangular, rectangular, pentagonal, hexagonal, heptagonal, octagonal or the like. The cone shaped transparent refractive hollow dome-shaped member may be truncated, for instance for forming the open top. Other appearances possible to fit to the corresponding conical reflector may also be possible. All these mentioned appearances may particularly contribute to the improved beam shaping capability.

According to one embodiment, the ratio between the height and the width of the transparent refractive hollow dome-shaped member is in the range from 0.4 to 1.0. By means of said ratio, the light distribution may be affected. The optical component comprising the transparent refractive hollow dome-shaped member may provide particular light distribution and beam shapings, when arranged on a light source.

According to one embodiment, the side angle of the transparent refractive hollow dome-shaped member to the longitudinal central axis of said transparent refractive hollow dome-shaped member is in the range of 20°-50°. At least five printed lines, preferably at least first ten lines calculated from the top of the top part may have a side angle also being in the range of 20°-50° depending how steep of bulging the appearance of said transparent refractive hollow dome-shaped member.

Preferably, the side angle may be between the longitudinal central axis of the transparent refractive hollow dome-shaped member and the outer side wall of the transparent refractive hollow dome-shaped member. A side angle of said side angle range implemented in the transparent refractive hollow dome-shaped member in an optical component may provide optical beam shaping effects. Particularly, the combination of said side angle in said range of 20°-50° and said layer thickness to layer width ratio in the range of 0.8-0.3 may be advantageous for achieving an sharpness of the central intensity of the beam shape and may provide an intensity gain.

For increasing the spot intensity of the optical component, which spot intensity refers to how much a light beam is spread over a surface, the transparent refractive hollow dome-shaped member may be provided with a decreasing side angle and an increasing layer thickness to layer width ratio.

According to one embodiment, the side angle of the transparent refractive hollow dome-shaped member to the longitudinal central axis of said transparent refractive hollow dome-shaped member is substantially non-constant.

The side wall of the transparent refractive hollow dome-shaped member may be alternately non-constant. For instance, said wall may have a more steep curvature from the top to the proximal bottom end leading to a more oblong appearance of the the transparent refractive hollow dome-shaped member. Alternatively, said wall may have a more bulging curvature from the top to the proximal bottom end leading to a more round appearance of the the transparent refractive hollow dome-shaped member.

Said side wall may be substantially constant or straight between two or more layers in a layer by layer-structure, meaning that the gradient is zero, corresponding to a substantially linear printing direction in the fused deposition modeling (FDM) process of the transparent refractive hollow dome-shaped member. In the corresponding way, said side wall may be non-constant, may substantially have a curvature, for instance may have a positive gradient or a negative gradient between two or more layers in the layer by layer-structure in the printing direction in the fused deposition modeling (FDM) process.

According to one embodiment, the opening of the top is adapted to provide an angular range of the light beam of 15°-40°, preferably 20°-35°. Thus, by means of said opening, the light beam has a corresponding angular range adapted to pass through said opening without interacting with said transparent refractive hollow dome-shaped member. By changing the opening size of said opening of the top, the light beam has a changed corresponding angular range adapted to pass through said opening without interacting with said transparent refractive hollow dome-shaped member. Accordingly, beam shaping effects may be provided.

According to a second aspect of the invention, a luminaire comprising a light source and the optical component as described above is provided. Theconical reflector has an inner surface being diffusely reflective is arranged to receive light provided by the light source, and wherein the top of the transparent refractive hollow dome-shaped member faces away from the light source. By said composed optical component arranged on a light source, the luminaire may provide a combination of beam shaping effects and an intensity gain, particularly in a forward direction outward from the light source.

According to one embodiment, a first part of the output of the light source, corresponding to a light beam of a first angular range, is adapted to be provided out of the opening of said top of the transparent refractive hollow dome-shaped member without interaction with said transparent refractive hollow dome-shaped member. Said lack of interaction may be lack of light refraction with the light transparent printed material. The first part of the output of the light source may correspond to a light beam of a first angular range, which may be in the range of 15°-40°, preferably 20°-35°. By the first part of the output of the light source, the luminaire may particularly provide beam shaping effects.

According to one embodiment, a second part of the output of the light source, corresponding to a light beam of a second angular range, is adapted to interact with the transparent refractive hollow dome-shaped member, to be redirected to lesser angles, and/or to be redirected back towards the light source. Said interaction may be light refraction with the light transparent printed material of the transparent refractive hollow dome-shaped member. Such an embodiment offers the advantage of providing an intensity gain in the forward direction from the light source. The second part of the output of the light source may correspond to a light beam of a second angular range, which may be in the range of 40°-70°. By the second part of the output of the light source, the luminaire may particularly provide an intensity gain.

According to one embodiment, in the luminaire a part of the light of the light source is collimated by the conical reflector having an inner surface being diffusely reflective into collimated light and that a part of the collimated light is refracted by transparent refractive hollow dome-shaped member whereof a part is emitted out of the opening without interaction with said conical reflector having an inner surface being diffusely reflective.

Advantageously, the composed luminaire may provide a large amount of collimated which may provide minimal spread of light beam as it propage.

According to a third aspect of the invention, a method for manufacturing an optical component for beam shaping is provided. As described above, the optical component comprises a conical reflector having an inner surface being diffusely reflective provided with a transparent refractive hollow dome-shaped member having an open top.

The method of the present invention comprises the step of manufacturing the transparent refractive hollow dome-shaped member by means of fused deposition modeling (FDM) using a transparent polymeric material as printing material.

By means of this method, an optical component for beam shaping, particularly in the forward direction from the light source, may be manufactured in an accurate and cost-efficient manner.

According to one embodiment, the method of the present disclosure comprises the further step of manufacturing the conical reflector by means of fused deposition modeling (FDM) using a reflective thermoplastic polymer material as further printing material.

Typically both components may be printed in one printing operation, in one go, i.e. the transparent refractive hollow dome-shaped member may be subsequently printed on the firstly printed diffuse shaped reflector. Alternatively, the diffuse shaped reflector may be subsequently printed on the firstly printed the transparent refractive hollow dome-shaped member. Alternatively, the method may comprise the step of connecting the diffuse shaped reflector to said transparent refractive hollow dome-shaped member. The method may comprise the further step of attaching the proximal end of the transparent refractive hollow dome-shaped member with the the upper end of the diffuse shaped reflector. The method may comprise additional method steps and/or details thereof.

BRIEF DESCRIPTION OF THE DRAWINGS

The invention will in the following be described in more detail with reference to the enclosed drawings, wherein.

DESCRIPTION OF EMBODIMENTS

Figure 1:
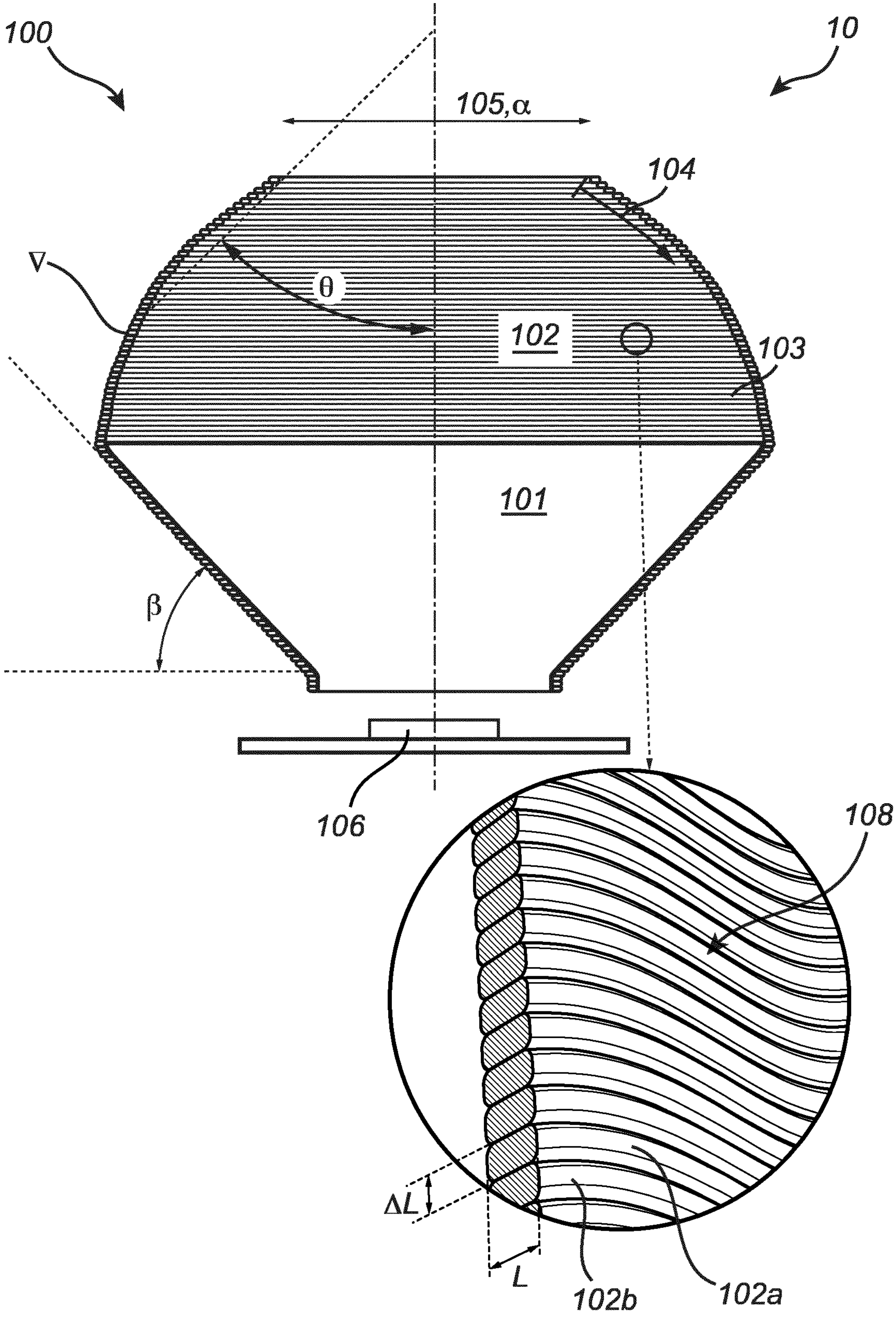
FIG. 1 shows a front view of a optical component for beam shaping shaping according to one embodiment of the invention.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

FIG. 1*a* shows a schematic illustration of an optical component 100 according to one embodiment. The optical component 100 comprises a conical reflector 101 and a transparent refractive hollow dome-shaped member 102. The conical reflector 101 has an inner surface being diffusely reflective. Said inner surface may be covered with a reflective material, e.g. aluminum or paint. In embodiments, the reflectivity is preferably at least 80%, more preferably at least 85%, most preferably at least 88%. Furthermore, in embodiments, the conical reflector 101 may have a largest diameter of at least 20 mm, preferably at least 30 mm, more preferably at least 40 mm, most preferably at least 50 mm. Hereinafter the conical reflector 101 according to above is referred to as the "diffuse shaped reflector" 101.

Further, said transparent refractive hollow dome-shaped member 102 has a proximal end 103 arranged in contact with said diffuse shaped reflector 101, and a top 104 arranged at a distance from said diffuse shaped reflector 101, and that said top 104 has an opening 105.

The transparent refractive hollow dome-shaped member 102 is provided with said open top 105 for the beam shaping of the light output out of the optical component 100. The size of the opening 105 of the open top 104 is adapted to provide a desired angular range α of the light beam. In this way, desired beam shaping effects may be obtained. In embodiments, the opening 105 may have a diameter of at least 5 mm, preferably at least 10 mm, more preferably at least 15 mm, most preferably at least 20 mm.

The transparent refractive hollow dome-shaped member 102 is manufactured by means of an the additive manufacturing process such as fused deposition modeling (FDM) using a transparent polymeric material as printing material, involving an attained layer by layer structure 108 by laying down printing material in layers 102*a*, 102*b*, see FIG. 1. For instance, a filament may be unwound from a coil and supplied to produce at least a part of the layers 102*a*, 102*b* of transparent polymeric material deposited on top of each other, resulting in the characteristic ribbed structure or surface texture 108. Each layer 102*a* of the transparent polymeric material may be preferably positioned, and preferably deposited, on top of the previous, preceding layer 102*b*. In embodiments, the ribbed surface texture of the transparent refractive hollow dome-shaped member 102 may comprise at least 10 ribs.

In greater detail, each layer 102*a*, 102*b* has a layer thickness, ΔL and a layer width, L. In embodiments, the layer thickness ΔL may be in a range from 0.3 mm to 3 mm and the layer width L may be in a range from 0.4 mm to 4 mm. Then the layer thickness to layer width ratio, ΔL/L preferably is in the range of 0.8-0.3 for optimizing the sharpness of the central intensity, which contributes to an intensity gain of the optical component 10. The layer width L may substantially be the same as the nozzle diameter of the FDM based manufacturing assembly. In embodiments, the transparent refractive hollow dome-shaped member 102 may have a largest diameter of at least 20 mm, preferably at least 30 mm, more preferably at least 40 mm, most preferably at least 50 mm.

FIG. 1 further shows the side angle, θ of the transparent refractive hollow dome-shaped member 102, which preferably is in the range of 20°-50° for obtaining the desired spotintensity and beam shaping as well.

For shaping the appearance and the beam shaping capacity of the transparent refractive hollow dome-shaped member 102, the side wall 103, 104 implemented in the transparent refractive hollow dome-shaped member 102, related to said side angle θ with respect to the longitudinal central axis, may be alternately substantially constant from the top 104 to the proximal end 103, i.e. the bottom portion so that the gradient ∇=0, which corresponds to a substantially straight linear printing direction in the additive manufacturing process of of said transparent refractive hollow dome-shaped member 102. Alternatively, said wall 103, 104 may also be alternately non-constant. For instance, said wall 103, 104 may have a more steep curvature from the top 104 to the proximal bottom 103 end leading to a more oblong appearance of the the transparent refractive hollow dome-shaped member 102. Alternatively, said wall 103, 104 may have a more bulging curvature from the top 104 to the proximal bottom end 103 leading to a more round appearance of the the transparent refractive hollow dome-shaped member 102.

The curvature may be constituted of a positive gradient +∇, which corresponds to a substantially positive inclination or curvature in the printing direction in the additive manufacturing process of the transparent refractive hollow dome-shaped member 102, or a negative gradient, −∇, which corresponds to a substantially negative inclination or curvature in the printing direction in the additive manufacturing process of the transparent refractive hollow dome-shaped member 102. In this way, by combining a gradient being zero with a positive gradient and/or a negative gradient, respectively, in the layer by layer structure, the appearance and the beam shaping capacity may be optimized, which is to be shown in the following.

Figure 2:
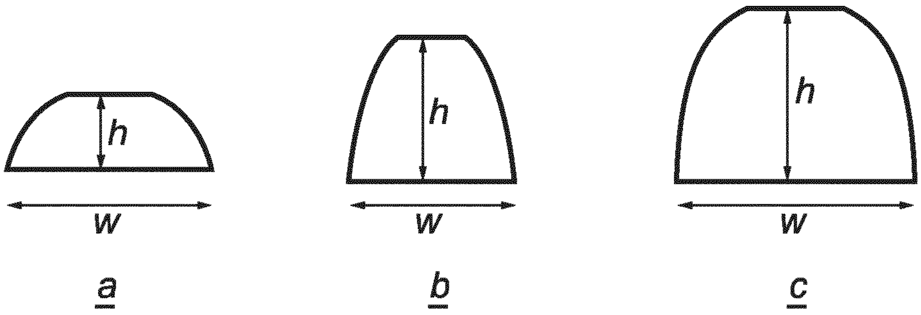
FIG. 2 shows three examples of transparent refractive hollow dome-shaped members according to three embodiments of the invention.

FIG. 2 shows three embodiments "a", "b" resp. "c" of transparent hollow refractive dome-shaped members 102 for shaping different beam shapes, which all three are manufactured by means a fused deposition modeling (FDM), using a transparent polymeric material as printing material. In example "a", the transparent refractive hollow dome-shaped member 102 has a more flat appearance, and the ratio between the height (h) and the width (w), h/w is approximately 0.4. In example "b", the transparent refractive hollow dome-shaped member 102 has a more acute and oblong appearance and the respective ratio, h/w is approximately 1.0. In example "c", the transparent refractive hollow dome-shaped member 102 has a more round and bulky appearance and the respective ratio, h/w is then approximately 0.7.

For increasing the spot intensity of the optical component 100, which spot intensity refers to how much a light beam is spread over a surface, the transparent refractive hollow dome-shaped member 102 is provided with a decreasing side angle θ with respect to the longitudinal central axis of the transparent refractive hollow dome-shaped member 102 and an increasing layer thickness to layer width ratio, ΔL/L, respectively. Thus, "b" may provide the best spot intensity of the examples "a", "b" and "c".

The transparent refractive hollow dome-shaped member 102 may also be substantially cone-shaped. The cone shaped transparent refractive hollow dome-shaped member 102 may be truncated for forming the open top 105.

Preferably, the transparent refractive hollow dome-shaped member 102 and the diffuse shaped reflector 101 may be connected at their respective bases in a geometrial perspective.

For obtaining the composed optical component 100, the diffuse shaped reflector 101 and the transparent refractive hollow dome-shaped member 102 are preferably connected with each other at the proximal end 103 of the transparent refractive hollow dome-shaped member 102 and the upper end of the conical diffuse shaped reflector 101. Alternatively, the transparent refractive hollow dome-shaped member 102 may be provided on the diffuse shaped reflector 101, for instance in connection to the upper edge of the diffuse shaped reflector 101, as a part of the manufacturing process, which is to be described later on.

A luminaire 10 comprising a light source 106 and said optical component 100 for beam shaping, realized according to above, may be provided, wherein the diffuse shaped reflector 101 is arranged to receive light providedby the light source 106, and wherein the top 104 of the transparent refractive hollow dome-shaped member 102 faces away from the light source 106. The luminaire 10 comprises the optical component 100 arranged on a light source 106. The light source 106 may be a Lambertian light source 106, for instance a Chip On Board (COB) or the like.

FIG. 1 also shows a first part of the output of the light source 106 of the luminaire 10, which may correspond to a light beam of a first angular range α, which is adapted to be providedout of the opening 105 of the top 104 of the transparent refractive hollow dome-shaped member 102 without interaction and refraction with said transparent refractive hollow dome-shaped member 102. The first angular range, a is preferably in the angular range 20°-35°. Further, a second part of the output of the light source 106 of the luminaire 10, which may correspond to a light beam of a second angular range β, which is adapted to interact and to refract with the transparent refractive hollow dome-shaped member 102, thereafter to be redirected to lesser angles, and/or to be redirected back towards the light source 106. The second angular range β, is preferably in the range of 40°-70°.

In the described way, the luminaire 10 comprising the optical component 100 for beam shaping, which provides beam shape having an intensity gain, particularly in the forward direction from the light source.

A method 200 for manufacturing an optical component 100 according to above is now to be described in the following.

Figure 3:
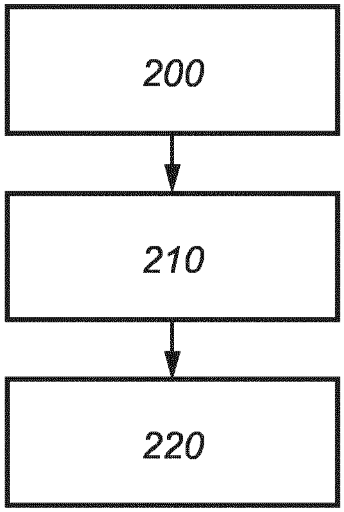
FIG. 3 shows a flowchart of the method for manufacturing an optical component for beam shaping according to one embodiment of the invention, and FIGS. 4*a* and 4*b* each show a polar luminous intensity plot.

FIG. 3 shows an embodiment of a method for manufacturing an optical component 100 for beam shaping, comprising a conical reflector 101 having an inner surface being diffusely reflective provided with a transparent refractive hollow dome-shaped member 102 having an open top 105.

The method comprises the step 200 of manufacturing the transparent refractive hollow dome-shaped member 102 by means of fused deposition modeling (FDM) using a transparent polymeric material as printing material.

The method may comprise the further step 210 of providing the diffuse shaped reflector 101. The method may comprise the further step of depositing the layer on layer structure directly on the diffuse shaped reflector 101. Typically both components are printed in one printing operation, in one go, i.e. the transparent refractive hollow dome-shaped member 102 is subsequently printed on the firstly printed diffuse shaped reflector 101. Alternatively, the diffuse shaped reflector 101 is subsequently printed on the firstly printed the transparent refractive hollow dome-shaped member 102.

Figure 4A:
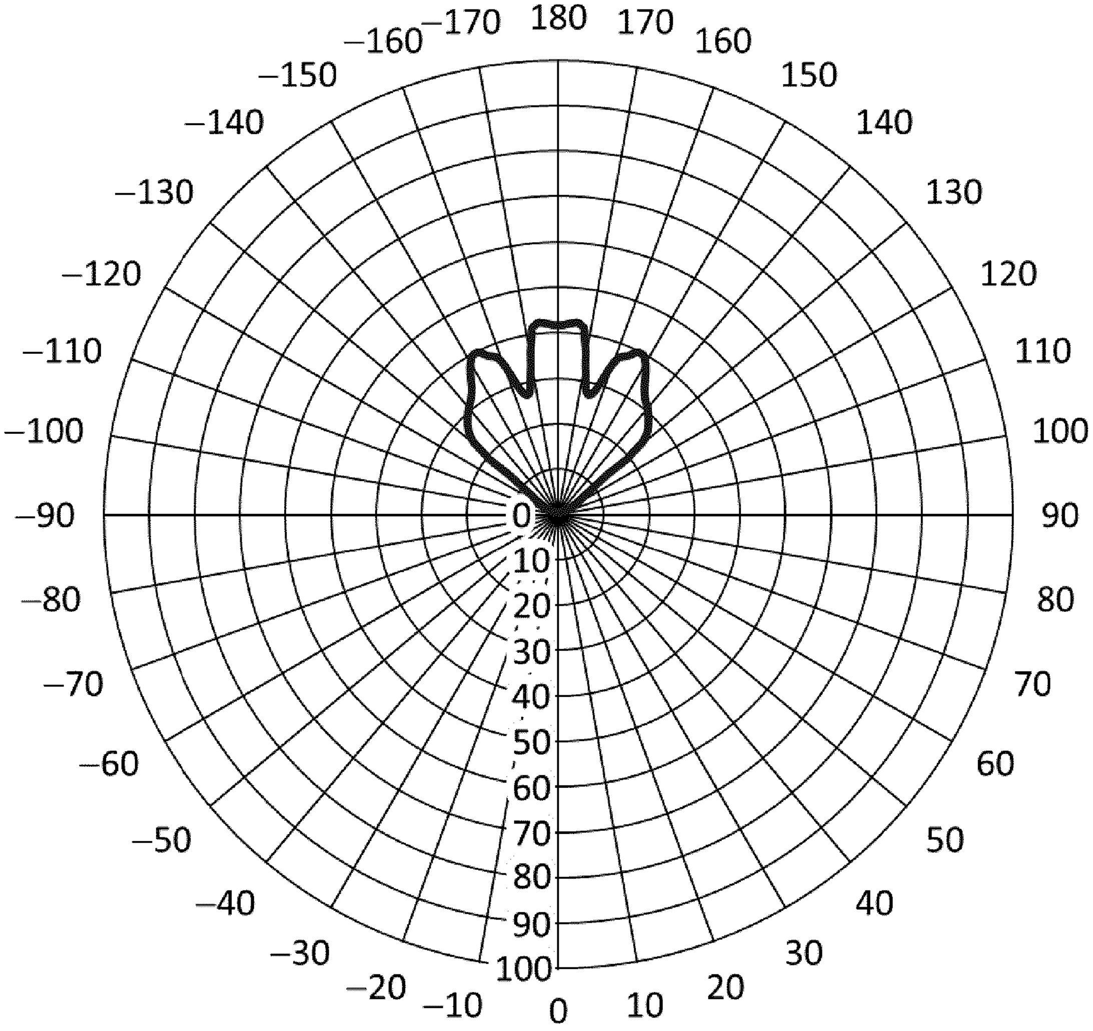
Figure 4B:
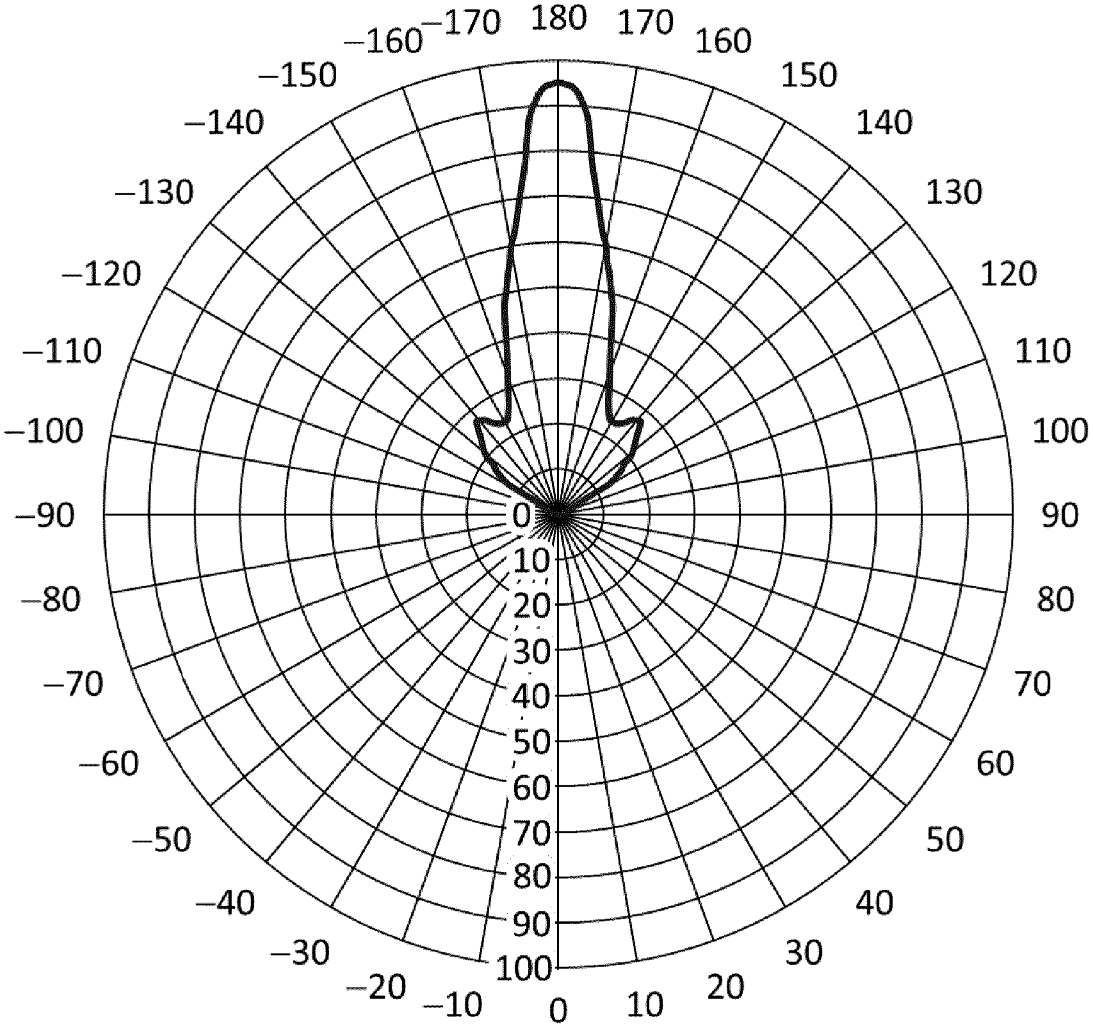

FIGS. 4*a* and 4*b* each show a polar luminous intensity plot, being a polar plot of the luminous intensity in candela as a function of the angle.

Each polar plot belongs to a lighting device of the type shown in FIG. 1, being a lighting device that comprises a light source and an optical component, wherein the optical component has (i) a conical reflector with a diffusely reflective inner surface arranged to receive light emitted by the light source, and (ii) a transparent refractive hollow dome-shaped member, wherein the transparent refractive hollow dome-shaped member has a proximal end arranged in contact with the conical reflector, and a top arranged at a distance from the conical reflector facing away from the light source, and wherein the top has an opening.

The angles in the plots of FIGS. 4*a* and 4*b* are measured relative to the longitudinal central axis of the lighting device, which axis is also shown in FIG. 1 as the axis relative to which the side angle θ of the dome-shaped member 102 is measured.

An angle of 180 degrees corresponds with a direction parallel to the longitudinal central axis of the lighting device and from the light source towards the opening at the top of the dome-shaped member.

For the plot of FIG. 4*a*, the conical reflector and the transparent refractive hollow dome-shaped member both have smooth surfaces.

For the plot of FIG. 4*b*, the conical reflector has smooth surfaces while the transparent refractive hollow dome-shaped member has been made by means of fused deposition modeling using a transparent thermoplastic polymer material as printing material.

In other words, the difference between the plots of FIGS. 4*a* and 4*b* is that the former belongs to belongs to a lighting device having an optical component of which the inner and outer sides of the transparent refractive hollow dome-shaped member are smooth, while the latter belongs to lighting device having an optical component of which the inner and outer sides of the transparent refractive hollow dome-shaped member have a ribbed surface texture.

As can be seen by comparing the plots of FIGS. 4*a* and 4*b*, the above difference between the two lighting devices has the result that the maximum luminous intensity has increased from about 42 candela to about 96 candela.

In other words, for the aforementioned lighting device, using a dome-shaped member having inner and outer sides with a ribbed surface texture instead of a dome-shaped member with smooth inner and outer sides results in an intensity gain in a forward direction with a factor of about 2.3.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. An optical component for beam shaping comprising:

a conical reflector having an inner surface being diffusely reflective, a transparent refractive hollow dome-shaped member, wherein said transparent refractive hollow dome-shaped member has a proximal end arranged in contact with said conical reflector, and a top arranged at a distance from said conical reflector, wherein said top has an opening; and wherein said transparent refractive hollow dome-shaped member is manufactured by means of fused deposition modeling (FDM) using a transparent thermoplastic polymer material as printing material, so that the transparent refractive hollow dome-shaped member has a ribbed surface texture on an inner side and/or on an outer side of the transparent refractive hollow dome-shaped member.

2. An optical component according to claim 1, wherein said conical reflector is manufactured by means of fused deposition modeling (FDM) using a reflective thermoplastic polymer material as further printing material.

3. An optical component according to claim 1, wherein said transparent refractive hollow dome-shaped member is a layer by layer structure, wherein each layer has a layer thickness (ΔL) and a layer width (L), whereby the layer thickness to layer width ratio (ΔL/L) is in the range of 0.8-0.3.

4. An optical component according to claim 1, wherein the transparent refractive hollow dome-shaped member is cone-shaped and has a cross-section with a circular or polygon-shape, or combinations thereof.

5. An optical component according to claim 1, wherein the ratio between the height (h) and the width (w) of the transparent refractive hollow dome-shaped member, (h/w) is in the range from 0.4 to 1.0.

6. An optical component according to claim 1, wherein a side angle (θ) of [a top part of] the transparent refractive hollow dome-shaped member to the longitudinal central axis of said transparent refractive hollow dome-shaped member is in the range of 20°-50°.

7. An optical component according to claim 1, wherein the side angle (θ) of the transparent refractive hollow dome-shaped member to the longitudinal central axis of said transparent refractive hollow dome-shaped member is substantially non-constant.

8. An optical component according to claim 1, the opening of the top is adapted to provide an angular range (α) of the light beam of 20°-35°.

9. A luminaire comprising a light source providing light source light and the optical component according to claim 1, wherein the conical reflector has an inner surface being diffusely reflective and is arranged to receive light emitted by the light source, and wherein the top of the transparent refractive hollow dome-shaped member faces away from the light source.

10. A luminaire according to claim 9, wherein a first part of the light source light provided by the light source, corresponding to a light beam of a first angular range (α), is adapted to be provided out of the opening of said top of the transparent refractive hollow dome-shaped member without interaction with said transparent refractive hollow dome-shaped member.

11. A luminaire according to claim 9 wherein a second part of the light source light emitted by the light source, corresponding to a light beam of a second angular range (β), is adapted to interact with the transparent refractive hollow dome-shaped member, to be redirected to lesser angles, and/or to be redirected back towards the light source.

12. A luminaire according to claim 9, wherein a part of the light of the light source is collimated by the conical reflector having an inner surface being diffusely reflective into collimated light and that a part of the collimated light is refracted by transparent refractive hollow dome-shaped member whereof a part is emitted out of the opening without interaction with said conical reflector having an inner surface being diffusely reflective.

13. A method for manufacturing an optical component for beam shaping comprising a conical reflector having an inner surface being diffusely reflective provided with a transparent refractive hollow dome-shaped member having an open top, wherein the method comprises the step of manufacturing the transparent refractive hollow dome-shaped member by means of fused deposition modeling (FDM) using a transparent thermoplastic polymer material as printing material, so that the transparent refractive hollow dome-shaped member has a ribbed surface texture on an inner side and/or on an outer side of the transparent refractive hollow dome-shaped member.

14. The method as claimed in claim 13, wherein the method comprises the further step of manufacturing the conical reflector by means of fused deposition modeling (FDM) using a reflective thermoplastic polymer material as further printing material.

* * * * *